United States Patent [19]

Fishbaugh et al.

[11] 4,073,047
[45] Feb. 14, 1978

[54] METHOD OF MAKING VIBRATION DAMPER

[75] Inventors: Byron L. Fishbaugh; Harold E. Keller, both of St. Marys, Ohio; Lionel G. Stewart, N. Dartmouth, Mass.

[73] Assignee: The Goodyear Tire & Rubber Company, Akron, Ohio

[21] Appl. No.: 685,965

[22] Filed: May 13, 1976

Related U.S. Application Data

[60] Division of Ser. No. 536,508, Dec. 26, 1974, Pat. No. 3,990,324, and a continuation-in-part of Ser. No. 449,159, March 7, 1974, abandoned.

[51] Int. Cl.$^2$ ............................................. B23P 11/02
[52] U.S. Cl. .......................................... 29/450; 29/235; 29/451; 29/458; 29/460; 29/469.5; 29/525
[58] Field of Search ................ 29/451, 450, 235, 507, 29/508, 458, 460, 469.5, 525; 74/574; 264/262

[56] References Cited

U.S. PATENT DOCUMENTS

| | | | |
|---|---|---|---|
| 1,962,746 | 6/1934 | Lee | 74/574 |
| 2,052,448 | 8/1936 | Calaert | 29/451 X |
| 2,594,555 | 4/1952 | Hardy | 74/574 |
| 2,722,138 | 11/1955 | Neher | 74/574 |
| 3,058,371 | 10/1962 | Haushalter | 74/574 |
| 3,158,923 | 12/1964 | Reinsma | 29/451 UX |

*Primary Examiner*—Charlie T. Moon
*Attorney, Agent, or Firm*—F. W. Brunner; R. P. Yaist; L. A. Germain

[57] ABSTRACT

An improved vibration damper for use with oscillating bodies and the method of making said damper. The damper includes an inner core member or hub, an outer inertia mass member or inertia ring surrounding and spaced from the hub, and compressible resilient damping means such as a layer of compressible elastomeric material under a limited compression and a retaining means such as a metallic band disposed between the core member and the inertia member. The damping means is chemically adhered to both the retaining means and the core member or the inertia member and the retaining means is fixed in an interference fit to either the outer peripheral surface of the core member or the inner peripheral surface of the inertia member. The damper is particularly useful for mounting on the end of a crankshaft of an internal combustion engine.

6 Claims, 7 Drawing Figures

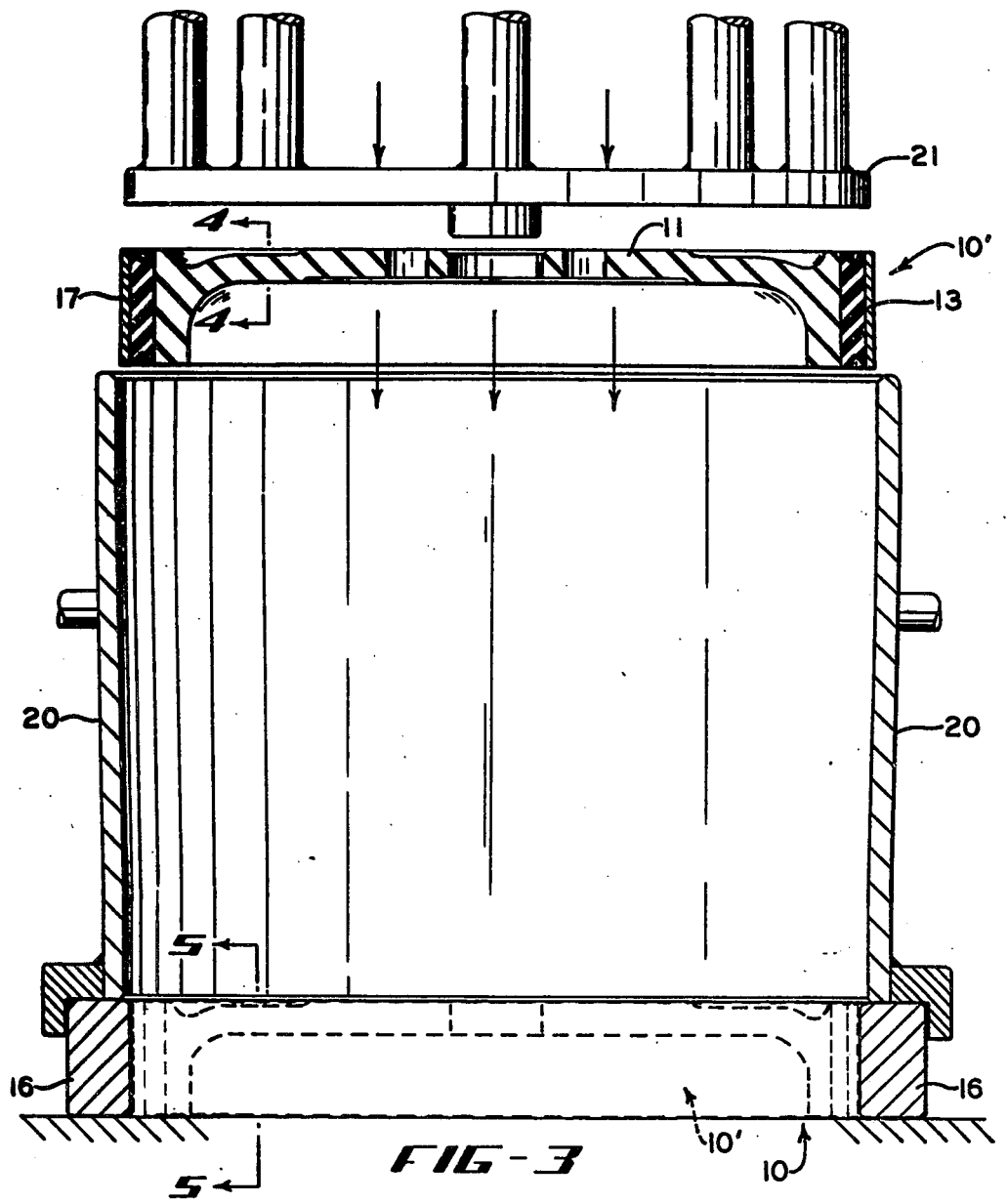
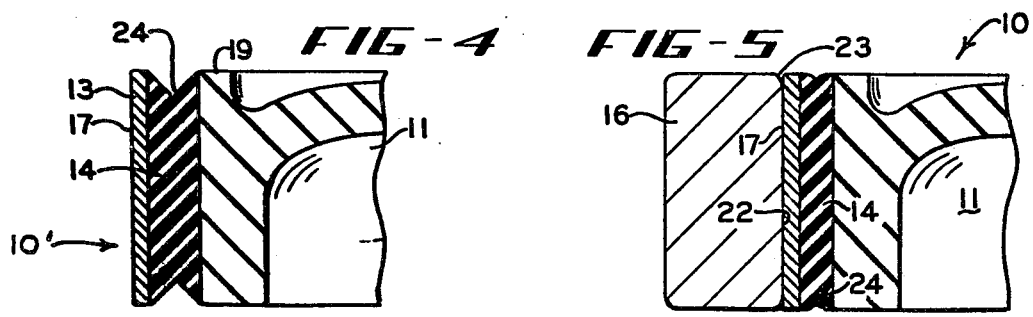

METHOD OF MAKING VIBRATION DAMPER

CROSS-REFERENCE TO RELATED APPLICATION

This is a divisional application of application Ser. No. 536,508 filed Dec. 26, 1974, now U.S. Pat. No. 3,990,324 issued Nov. 9, 1976, which was a continuation-in-part of application Ser. No. 449,159 filed Mar. 7, 1974, now abandoned.

BACKGROUND OF THE INVENTION

This invention relates to improved vibration dampers for use with oscillating bodies and particularly to torsional vibration dampers of the type to be mounted on the end of a crankshaft of an internal combustion engine. This invention also relates to the method of making such vibration dampers.

In the prior art, various type vibration dampers have been used to damp or attenuate torsional vibrations generated during the operation of various internal combustion engines. These dampers include a central metallic core or hub which is mounted to the crankshaft of the engine by means of bolts or the like and an outer inertia mass in the form of a relatively thick metal ring for the purpose of counteracting or counterbalancing the forces existing due to the rotation of the shaft. One well known type of damper used for many years is the viscous damper which employes a damping fluid such as silicone oil in a completely sealed unit with the torsional vibrations of the crankshaft being absorbed by the shear resistance of the viscous fluid.

More recently another type damper known as a viscous rubber damper has been developed in which the inner hub and the outer inertia ring are separated by an elastic damping member or spacer comprising a layer of flexible resilient elastomeric material such as rubber. In this type damper the torsional vibrations are absorbed not only by the shear resistance of the viscous fluid but also by the hysteresis of the rubber. Exemplary of the viscous rubber type torsional vibration dampers are those disclosed in U.S. Pat. Nos. 3,603,172 and 3,707,031 to Hall and U.S. Pat. No. 3,678,782 to Hidemasa.

In another type damper not employing a viscous liquid, the elastic damper member is retained between the inner hub and the outer inertia ring under a high degree of compression usually from about 25 to about 50 percent of the original thickness of the elastic member.

Each of the beforenamed type dampers have disadvantages which adversely affect their operation. For example, the sealed viscous vibration dampers are costly to manufacture and since the unit is sealed, it is difficult to determine when there is a malfunction. The nonviscious type dampers have also not been completely satisfactory in many instances. Since the elastic damper member is held in position between the inner hub and the outer inertia ring solely because of the high degree of compression, the rubber may tend to roll out from between the inter faces with the metal elements. This is due primarily to the torque impulses created during the operation of the engine which may cause the rubber to flex as much as 200 times per second. This loss in rubber results in a rather drastic change in dynamic characteristics of the damper. Furthermore, in previous vibration dampers it has been common to use rubbery polymeric material such as natural rubber or synthetic rubber which do not maintain the desirable characteristics of dynamic stiffness or modulus and damping over a wide termperature range. This has been particularly true of dampers used on turbo-charged engines.

The above-mentioned difficulties of the prior art have been overcome by the present invention by use of an improved vibration damper and method of making same as will be hereinafter described.

OBJECTS OF THE INVENTION

It is a general object of the present invention to provide an improved vibration damper structure which is more economical to produce and has a longer service life.

It is another important object of the present invention to provide a vibration damper unit for mounting on an oscillating body in which the elastic damper member is positively and firmly bonded to the inner damper core and outer inertia mass member so that rolling out of the elastomeric material between the interface of the rigid metallic components of the damper will be less likely to occur.

It is an additional important object of the invention to provide a vibration damper which may be visually inspected more easily to determine the existence of defects or malfunctions.

It is still another object of the present invention to provide an improved torsional vibration damper of the type to be mounted on the end of a crankshaft of an internal combustion engine in which the compressed flexible resilient damping layer will have an increased service life by virtue of being compressed only to a limited amount of its original thickness.

It is still another object of the present invention to provide a torsional vibration damper for use with turbo-charged engines in which the flexible resilient damping material will function for long periods of time with little change in dynamic characteristics and will maintain a relatively uniform modulus over a wide temperature range.

It is a still further object of the present invention to provide an improved method of making a vibration damper unit which will accomplish these beforementioned objects.

Other objects and advantages of this invention will become apparent hereinafter as the description thereof proceeds, the novel features, arrangements and combinations being clearly pointed out in the specification as well as the claims thereunto appended.

In accordance with the present invention, it has been discovered that the above objects and advantages are accomplished by a vibration damper unit of integral construction for use with an oscillating body with the unit comprising (A) a core member having an outer peripheral surface extending along the axial length thereof; (B) an inertia mass member having an inner peripheral surface surrounding and spaced from the outer peripheral surface of the core member; (C) damping means of compressible resilient material disposed between the outer peripheral surface of the core member and the inner peripheral surface of the inertia mass member and having one periphery thereof chemically adhered to the confronting peripheral surface of one of the members with the damping means being under a limited compression; (D) retaining means disposed between the outer peripheral surface of the core member and the inner peripheral surface of the inertia mass member and having one periphery thereof chemically adhered to the opposite periphery of said damping means and having the opposite periphery thereof fixed in an interference fit to the confronting peripheral surface of the other member; and (E) means to attach the unit to the body.

The damping means is preferably a continuous elastic or elastomeric member which undergoes a compression of from about 5 to about 30 percent of its original thickness. Even more preferably the elastic damper member is compressed from about 5 to about 15 percent of its original thickness and even more preferably is compressed about 10 percent of its original thickness.

The elastic damper member is prefereably comprised of a heat-resistant rubbery polymer such as ethylene propylene terpolymer.

It has also been discovered that the above objects and advantages are accomplished by providing a method of making a vibration damper for use with an oscillating body with the method comprising (A) chemically adhering one periphery of the compressible resilient damping means to the confronting peripheral surface of either an inner core member or an outer inertia member; (B) chemically adhering retaining means to the opposite periphery of the damping means; (C) compressing the damping means for a limited amount of its original thickness; and (D) fixing the retaining means to the confronting peripheral surface of either the core member or the inertia ring member by interference fitting to form an integral vibration damper.

BRIEF DESCRIPTION OF THE DRAWINGS

FIG. 3 is an elevational view partly in section showing a method of forming the vibration damper of FIG. 1;

FIG. 4 is an enlarged sectional view taken on line 4—4 of FIG. 3 showing the damper subassembly prior to its insertion into the inertia member;

FIG. 5 is an enlarged sectional view taken on line 5—5 of FIG. 3 showing the completed vibration damper unit after the subassembly has been forceably inserted within the inertia member;

DESCRIPTION OF THE PREFERRED EMBODIMENTS

Figure 1:
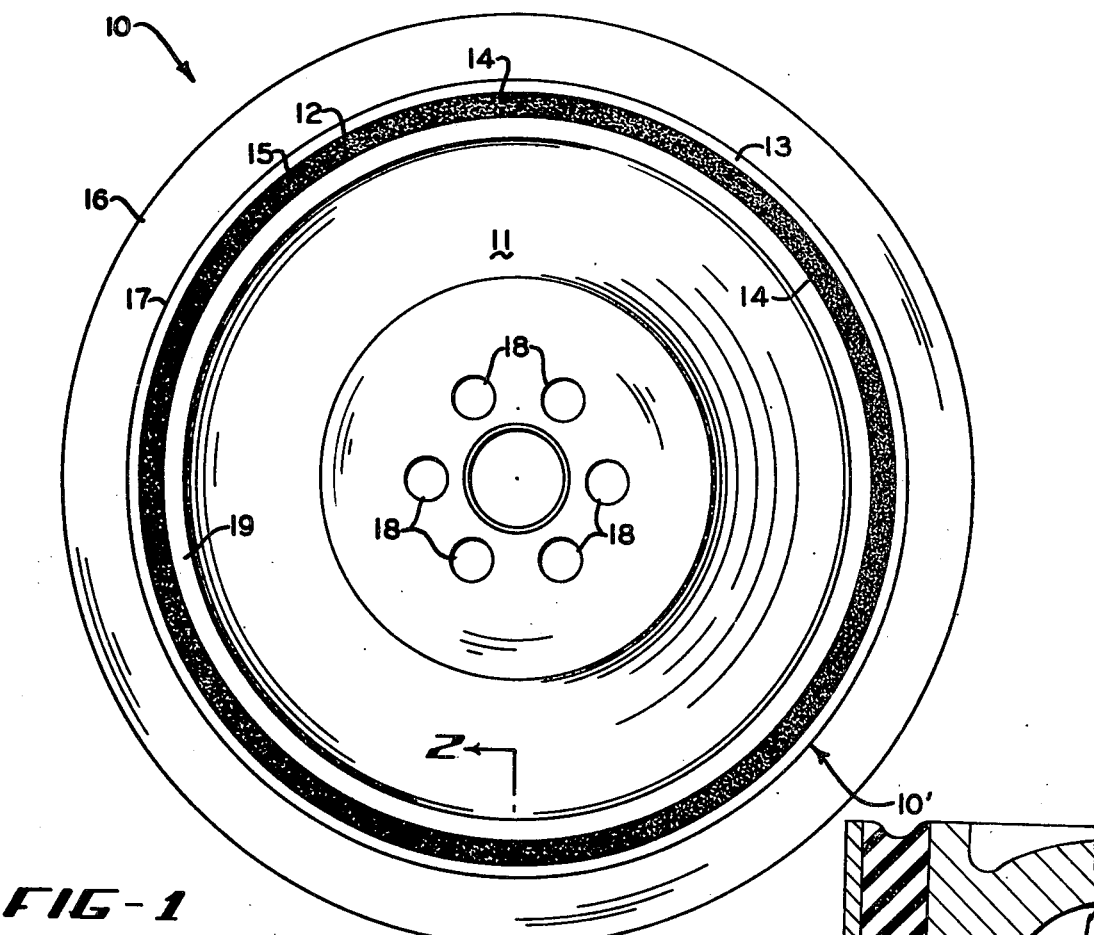
FIG. 1 is a plan view of the vibration damper of the invention.

In FIG. 1 the improved vibration damper 10 of the invention is shown. The damper unit includes a central core member 11 having an outer peripheral surface 12 extending along its axial length, retaining means 13 having an inner peripheral surface surrounding and spaced from the outer peripheral surface 12 of the core member 11, damping means 14 of compressible resilient material under a limited compression disposed between and chemically adhered to the inner peripheral surface 15 of the retaining means 13, and an inertia mass member 16 having an inner peripheral surface in fixed compressive engagement with the outer peripheral surface 17 of the retaining means 13. The mass member 16 and the retaining means 13 are joined or fixed together by means of an interference fit. For example the mass member 16 has an inner perimeter slightly less than the outer perimeter of the retaining means 13 before engagement with the retaining means so that the outer perimeter of the retaining means is reduced slightly when the retaining means is forceably positioned in the mass member. The damper illustrated is a torsional vibration damper of the type to be mounted on the end of a crankshaft of an internal combustion engine (not shown).

The core member 11 is in the form of an annular hub formed of a metal casting or stamping which includes means such as bolt holes 18 for mounting the hub to the crankshaft. The hub 11 also includes a flange 19 at its outer circumference to which the inner peripheral surface of the damping means is adhered. The flange has an outer contacting surface 12 extending axially of the hub 11.

The damping means 14 is preferably a circular elastic member or element comprising a flexible resilient damping layer of compressible material such as rubber adhered in a compressed condition to the outer peripheral surface 12 of the hub 11. The inner peripheral surface of the damping layer is chemically bonded to the outer surface of the flange 19 during vulcanization. The width of the outer contacting surface of the flange preferably is substantially the same as the width of the inner peripheral surface of the damping layer 14.

Figures 2, 2A, 6:
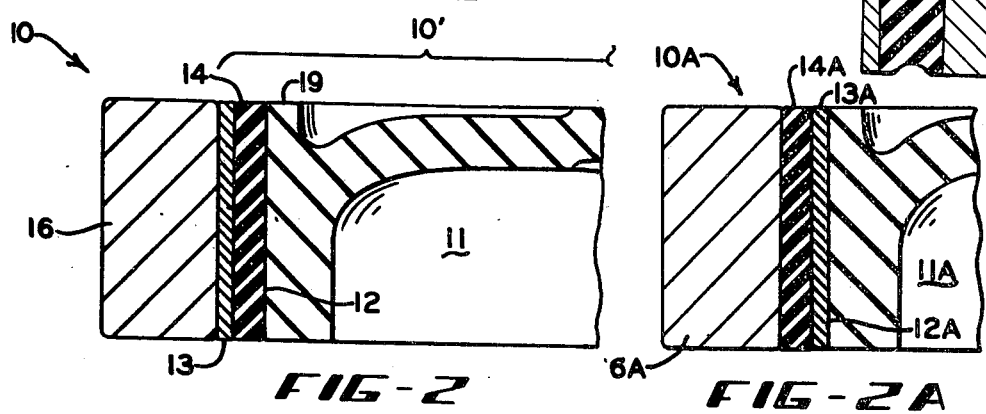
FIG. 2 is an enlarged sectional view of the invention taken along lines 2—2 of FIG. 1.
FIG. 2A is a modification of the invention shown in FIG. 2.
FIG. 6 is a modification of the invention shown in FIG. 4.

The retaining means 13 is preferably in the form of at least one retaining element of high modulus material such as a continuous annular metal band. The metal band 13 is chemically adhered to the outer peripheral surface of the layer 14 to retain the layer in position on the hub 11 to thereby form the damper subassembly 10'. As best seen in FIG. 2, the width of the inner peripheral surface of the band 13 and of the flange 19 should be substantially the same as the width of the outer peripheral surface of the damping layer 14 and is bonded thereto over substantially the entire area thereof. The damping layer 14 when in a compressed state, has a width which is substantially the same as the width of the band 13 and the flange 19 so that no appreciable portion of the layer protrudes beyond the edges of the band and the flange. This minimizes the possibility of a fold being created in the rubber material of the damping layer 14 at the respective interfaces of the layer 14 with the band 13 and the flange 19 which could result in detrimental stress points being created by resulting rubber-to-rubber or rubber-to-metal frictional contact. At this point it is well to emphasize that the damping layer 14 must be positively and firmly bonded in the vibration damper 10 to eliminate fretting or abrading of the rubber at the interface with the exposed metal surfaces.

Of course, it should be realized that the retaining element may also take other forms, for instance, it may be discontinuous throughout its circumferential length and be disposed in a plurality of strips positioned around the outer peripheral surface of the damping layer.

The inertia mass member 16 is commonly a rigid metallic inertia ring attached in fixed compressive engagement to the outer peripheral surface of the element or band by means of an interference or force-fit. This is accomplished by a swaging and press fitting operation which will be hereinafter described. The ring 16, as most clearly illustrated in FIG. 2, has a greater thickness than the band 13 and has an inner perimeter slightly less than the outer perimeter of the band so that when the damper subassembly 10' is disposed within the inertia ring 16, both the band 13 and the elastic damper layer 14 are radially compressed to a slight degree.

After the vibration damper assembly 10 is completed, the damper layer 14 preferably has undergone compression of from about 5 to about 30 percent of its original thickness. It is even more prefered that the damping layer be compressed from about 5 to about 15 percent of its original thickness. In this regard, it has been determined that very favorable results occur when the damping material is compressed to about 10 percent of its original thickness.

This is an important feature of the invention since compression of the elastic damping layer is necessary in order to relieve the tensile bonding stresses in this layer which occur during vulcanization due to shrinkage. It is, however, important to control and limit the amount or degree of compression which the damper layer undergoes to insure maximum service life of the damper unit.

The deformable material of the damping layer 14 is a flexible polymeric or elastomeric material such as natural or synthetic rubber. It is preferred that the material be a heat-resistant rubbery polymer such as ethylene propylene terpolymer. This material should be compounded to have a high damping coefficient for optimum results.

The ethylene propylene terpolymers which may be used in accordance with the present invention are terpolymers of ethylene, propylene and non-conjugated dienes (EPDM). Representative examples of these rubbery terpolymers are described in U.S. Pat. No. 3,331,793, Column 2, lines 54-59.

Other embodiments or modificiations of the invention are possible with the damper means and retaining means being rearranged in the damper assembly. For instance, the damper means can be chemically adhered or bonded directly to the confronting surface of the inertia mass member rather than to the confronting surface of the core and to the outer periphery of the retaining element rather than to its inner periphery. In this event, it is to be understood that the retaining means would then be fixed or attached to the confronting peripheral surface of the central core or hub rather than to the inertia mass member or ring. In either case the important features of the invention are accomplished including positive and firm bonding of the compressible resilient damping means within the damper, limited compression of the damper means, and the completing of the assembly by means of an interference or force-fit between adjoining metal surfaces.

In a modification of the invention shown in FIG. 2A a vibration damper assembly 10A is shown in which the damping means 14A is chemically adhered to the inner peripheral surface of the inertia mass member 16A and the outer periphery of the retaining means 13A. The outer peripheral surface 12A of the core member 11A is in compressive force-fit engagement with the inner periphery of the retaining means 13A. In this case the hub or core member has an outer perimeter slightly greater than the inner perimeter of the retaining means so that the inner perimeter of the retaining means is increased slightly when the retaining means is forceably positioned around the core member.

In the preferred method of making the vibration damper in the present invention, first the outer peripheral surface 12 of the hub 11 and the inner peripheral surface 15 of the band 13 are prepared, for example, by sandblasting and coating with a suitable adhesive cement. These components are then placed in a concentric relationship within a mold with the core member or hub 11 disposed within the retaining band 13. The deformable damping material is then disposed within the void between the inner hub and the band by, for example, injection or transfer molding to form the damping layer 14, thereby completing the damper subassembly 10'. Of course, it should be appreciated that the elastomeric material of the damping layer may be applied between the hub and band components by other means well known in the art.

The subassembly 10' is formed into an integral unit by vulcanization under heat and pressure in conventional molding equipment.

The subassembly 10' is completed by the addition of the inertia ring 16 in a swaging and press fitting operation. As shown in FIG. 3, the vulcanized subassembly is positioned at the entry end of an elongated telescoped funnel 20. The funnel has a gradually decreasing diameter with a greater diameter at the entry end than at the exit end so that when the subassembly 10' is forced into the funnel by means of the plunger element 21, the elastomeric material is compressed radially inwardly as the metal band 13 is compressed radially inwardly toward the hub 11 by contact with the walls of the funnel. After the subassembly 10' has been forced through the funnel 20, the outer peripheral surface 17 of the band 13 is forced by means of the interference fit into compressive frictional engagement with the inner peripheral surface 22 of the inertia mass member 16 which is disposed at the bottom of the funnel 20. As best shown in FIG. 5, a portion 23 of the inner peripheral surface 22 of the inertia ring 16 is radiused so that the compressive frictional engagement with the outer peripheral surface 17 of the band 13 is facilitated. The inner perimeter of the inertia ring 16 is slightly less than the outer perimeter of the band 13 before compressive engagement therewith so that the outer perimeter of the band is reduced somewhat when it is forceably positioned within the ring 16.

In this way, the method includes in one operation compressing the damping layer 14 and immediately thereafter forcing the high modulus metallic band 13 into compressive engagement with the inner peripheral surface 22 of the outer inertia ring 16 to form an integral torsional vibration damper unit 10.

FIG. 4 illustrates that the damping layer 14 is preferably formed with a groove such as an annular groove 24 in each of its end portions prior to being compressed, thereby reducing its width so that when the elastic member is compressed it will not protrude appreciably beyond the edges of the metallic band member 13 and the flange 19 as is shown in FIG. 5. The groove 24 is preferably a continuous annular groove or depression formed around the outer periphery of the exposed end portions of the layer 14. Although this groove is shown in FIG. 4 as having a generally V-shaped configuration, it may take other forms such as being tapered inwardly at a gradual radius as shown in FIG. 6. The important consideration here is to prevent the elastomeric material of the exposed end faces of layer 14 from extending or protruding substantially beyond the edges of the metallic band 13 and the flange 19 for reasons previously explained.

Those skilled in the art will recognize that other means may be used to accomplish the method of the invention in addition to the equipment described in relation to FIG. 3 with equivalent results being obtained. For example, the damper unit 10 may be formed in a two-step operation in which the subassembly 10' is first compressed radially inwardly in a suitable swaging die and the inertia ring 16 being joined to the subassembly 10' in a separate press fitting operation.

In addition, it will be appreciated that modifications in the method disclosed will be necessary to produce the damper assembly shown in FIG. 2A. For example, in this case the outer inertia ring, damping layer and retaining member may first be formed into an assembly by vulcanization. Thereafter a suitable tapered tool may be used to effect compression of the damping layer and joining of this assembly to the core or hub by interference or force-fitting. It will be appreciated that in this procedure the damping means is compressed by expanding the retaining means outwardly toward the inertia ring member.

While certain representative embodiments and details have been shown for the purpose of illustrating the invention, it will be apparent to those skilled in the art that various changes and modifications may be made therein without departing from the spirit or scope of the invention.

We claim:

1. A method of making a vibration damper for use with an oscillating body, said damper including an inner core member and an outer inertia ring member surrounding and axially spaced from said core member with a retaining band and a resilient damping elastomer disposed between said core and inertia ring members, said method comprising the steps of:

preparing the inner surface of the retaining band and the outer surface of the core;

applying a chemical adhesive system to said prepared surfaces;

placing the retaining band and the core members in a mold in concentric relative position such that an annular mold space exists between the core and the outwardly positioned band;

filling the annular mold space with damping elastomer, said mold characterized by having its end surfaces in a configuration for forming annular grooves in the finished elastomer upon vulcanization;

applying heat and pressure to said mold to vulcanize the elastomer and initiate a chemical bonding action between the elastomer and the confronting peripheral surfaces of the band and the core, said elastomer extending across the entire width of said band and core members to form an integrally assembled unit;

removing said assembled unit from the mold and force fitting said unit into the inertia ring such that the damping elastomer remains in a limited compressed condition.

2. The method as claimed in claim 1 wherein said method comprises compressing said damping elastomer from about 5 to about 30 percent of its original vulcanized thickness.

3. A method of making a vibration damper for use with an oscillating body, said damper including an inner core member and an outer inertia ring member surrounding and axially spaced from said core member with a retaining band and a resilient damping elastomer disposed between said core and inertia ring members, said method comprising the steps of:

preparing the inner surface of the inertia ring and the outer surface of the retaining band;

applying a chemical adhesive system to said prepared surfaces;

placing the inertia ring and the retaining band in a mold in concentric relative position such that an annular mold space exists between the band and the outwardly positioned inertia ring;

filling the annular mold space with damping elastomer, said mold characterized by having its end surfaces in a configuration for forming annular grooves in the finished elastomer upon vulcanization;

applying heat and pressure to said mold to vulcanize the elastomer and initiate a chemical bonding action between the elastomer and the confronting peripheral surfaces of the inertia ring and retaining band members, said elastomer extending across the entire width of said band and inertia ring to form an integrally assembled unit;

removing said assembled unit from the mold and force fitting said unit onto the core member such that the damping elastomer remains in a limited compressed condition.

4. The method as claimed in claim 3 wherein the damping elastomer is compressed from about 5 to about 30 percent of its original vulcanized thickness.

5. The method as claimed in claim 3 wherein the damping elastomer is compressed 10 percent of its original vulcanized thickness.

6. The method as claimed in claim 1 wherein the damping elastomer is compressed 5 to 30 percent of its original vulcanized thickness.

* * * * *